US 12,410,855 B1

United States Patent
Takeshita et al.

(10) Patent No.: US 12,410,855 B1
(45) Date of Patent: Sep. 9, 2025

(54) DIFFERENTIAL WITH DISCONNECT AND LOCKING MECHANISMS

(71) Applicant: GKN Automotive Limited, Birmingham (GB)

(72) Inventors: Kazunobu Takeshita, West Bloomfield, MI (US); Toshiaki Komatsu, Commerce Township, MI (US)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 18/914,752

(22) Filed: Oct. 14, 2024

(51) Int. Cl.
    *F16H 48/24* (2006.01)
    *F16H 48/08* (2006.01)
    *F16H 48/34* (2012.01)

(52) U.S. Cl.
    CPC .............. *F16H 48/24* (2013.01); *F16H 48/08* (2013.01); *F16H 48/34* (2013.01)

(58) Field of Classification Search
    CPC .......... F16H 48/24; F16H 48/08; F16H 48/34; F16H 48/22; F16H 48/32; F16H 48/38; B60K 17/20
    USPC ................................................. 475/231, 233
    See application file for complete search history.

(56) References Cited

U.S. PATENT DOCUMENTS

| | | | |
|---|---|---|---|
| 7,325,664 B2 * | 2/2008 | Fusegi | F16H 48/24 192/84.92 |
| 10,308,113 B2 * | 6/2019 | Inose | B60K 17/165 |
| 2011/0105264 A1 * | 5/2011 | Maruyama | F16D 27/09 192/66.1 |
| 2024/0141975 A1 | 5/2024 | Lee | |

FOREIGN PATENT DOCUMENTS

| | | |
|---|---|---|
| JP | 2001044568 A | 2/2001 |
| JP | 2003042262 A | 2/2003 |
| JP | 2008302809 A | 12/2008 |

\* cited by examiner

*Primary Examiner* — Roger L Pang
(74) *Attorney, Agent, or Firm* — Reising Ethington P.C.

(57) ABSTRACT

A drivetrain component includes a first housing arranged to be rotated by a vehicle motive power source, a second housing, differential gears coupled to the second housing, and first and second clutches that define at least part of a disconnect mechanism and a locking mechanism. The first clutch has a disengaged state in which the first housing rotates relative to the second housing, and the first clutch has an engaged state in which the second housing is coupled to and rotates with the first housing. The second clutch has a disengaged state in which a first shaft can rotate at a different speed than a second output shaft, and the second clutch has an engaged state in which the first shaft and the second shaft rotate at the same speed.

18 Claims, 3 Drawing Sheets

DIFFERENTIAL WITH DISCONNECT AND LOCKING MECHANISMS

TECHNICAL FIELD

The present disclosure relates generally to a differential for a vehicle.

BACKGROUND

Vehicles include differentials that permit wheels of the vehicle to turn at different speeds, such as is needed when the vehicle is turning. Some differentials can include a lock that is engaged to drive wheels coupled to the differential with the same torque, in known manner. And some differentials include a disconnect device by which torque from a vehicle engine can be selectively provided or not to the wheels coupled to the differential so that the vehicle can be operated in 2-wheel drive and 4-wheel or all-wheel drive modes. Significant torque can be routed through some components of the differential in certain operating conditions and this can affect the durability of the differential, or require components of the differential to be larger, heavier and more robust to handle the torque loads.

SUMMARY

In at least some implementations, a drivetrain component includes a first housing arranged to be rotated by a vehicle motive power source, a second housing, differential gears coupled to the second housing, and first and second clutches that define at least part of a disconnect mechanism and a locking mechanism. The differential gears include at least one pinion gear, a first side gear engaged with the pinion gear, and a second side gear engaged with the pinion gear. The first clutch has a first clutch member that is coupled to the second housing, and a second clutch member that is coupled to the first housing. The first clutch has a disengaged state in which the first housing rotates relative to the second housing, and the first clutch has an engaged state in which the second housing is coupled to and rotates with the first housing. The second clutch has a first clutch member that is coupled to the first side gear and a second clutch member that is coupled to the second housing. The second clutch has a disengaged state in which the first clutch member of the second clutch is not engaged with the second clutch member of the second clutch and the first side gear can rotate at a different speed than the second side gear, and the second clutch has an engaged state in which the first clutch member of the second clutch is engaged with the second clutch member of the second clutch and the first side gear and the second side gear rotate at the same speed.

In at least some implementations, the first clutch member of the first clutch is defined by drive features formed on part of the second housing.

In at least some implementations, the first clutch member of the second clutch is defined by drive features formed on part of the first side gear.

In at least some implementations, the second clutch member of the second clutch rotates with the second housing and is slidably movable relative to the second housing.

In at least some implementations, a first actuator is carried by the first housing and operable to move the second clutch member of the first clutch relative to the first clutch member of the first clutch, and a second actuator is carried by the first housing and operable to move the second clutch member of the second clutch relative to the first clutch member of the second clutch. In at least some implementations, the first actuator is an electromagnetic actuator having a coil that, when powered, produces a magnetic field to drive a drive member that in turn drives the second clutch member of the first clutch relative to the first clutch member of the first clutch. In at least some implementations, the second actuator is an electromagnetic actuator having a second coil that, when powered, produces a magnetic field to drive a second drive member that in turn drives the second clutch member of the second clutch relative to the first clutch member of the second clutch.

In at least some implementations, the differential gears are received within an interior of the first housing, the first housing includes a first shaft mount having a first bore aligned with a first side gear opening of the first side gear so that a first shaft is receivable in the first shaft mount and the first side gear, the first actuator is mounted to the first shaft mount, the first housing includes a second shaft mount having a second bore aligned with a second side gear opening of the second side gear so that a second shaft is receivable in the second shaft mount and the second side gear, and the second actuator is mounted to the second shaft mount.

In at least some implementations, the first shaft mount opening and the second shaft mount opening are coaxially aligned.

In at least some implementations, a drivetrain component includes an outer housing arranged to be driven by a vehicle motive power source, an inner housing received at least partially in the outer housing and capable of rotation relative to the outer housing, a first clutch with a first clutch member connected to the outer housing and a second clutch member connected to or defined by part of the inner housing, differential gears coupled to the inner housing, the differential gears including at least one pinion gear, a first side gear engaged with the pinion gear, and a second side gear engaged with the pinion gear, a second clutch with a first clutch member of the second clutch being coupled to or defined by part of the first side gear, and with a second clutch member of the second clutch being coupled to the inner housing. The first clutch has a disengaged position in which the first clutch member of the first clutch and the second clutch member of the first clutch are not engaged with each other and the inner housing is not coupled to the outer housing by the first clutch, the first clutch as an engaged position in which the first clutch member of the first clutch and the second clutch member of the first clutch are engaged with each other and the inner housing is coupled to the outer housing and torque from the vehicle motive power source is transferred to the inner housing via the outer housing. The second clutch has a disengaged position in which the first clutch member of the second clutch and the second clutch member of the second clutch are not engaged with each other and the first side gear is not coupled to the inner housing by the second clutch, and the second clutch as an engaged position in which the first clutch member of the second clutch and the second clutch member of the second clutch are engaged with each other and the first side gear and the second side gear rotate at the same speed.

BRIEF DESCRIPTION OF THE DRAWINGS

The following detailed description of preferred embodiments and best mode will be set forth with reference to the accompanying drawings, in which.

DETAILED DESCRIPTION

Figure 1:
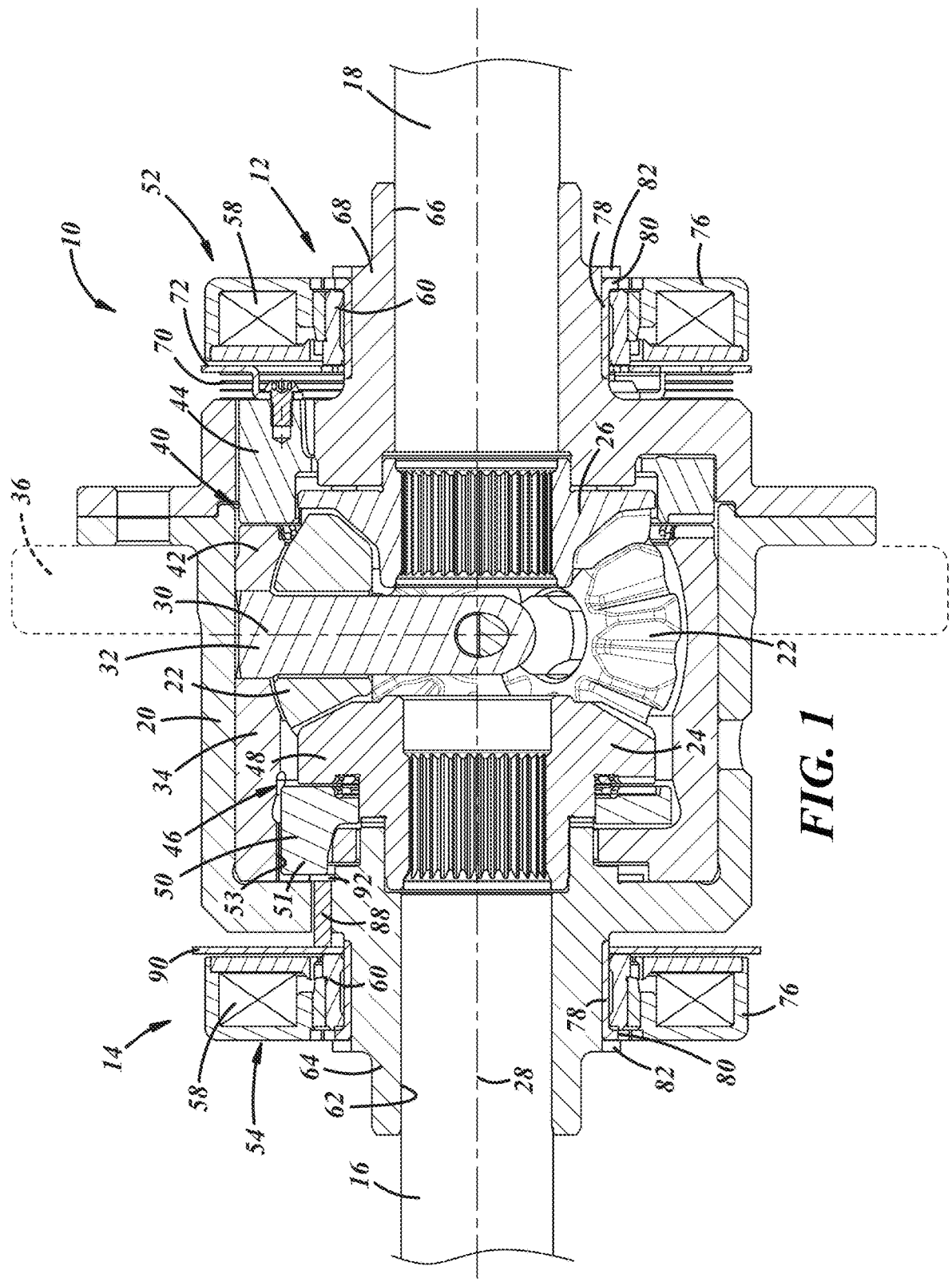
FIG. 1 is a sectional view of a differential including a disconnect mechanism and a locking mechanism.

Referring in more detail to the drawings, FIGS. 1-4 illustrate a drivetrain device shown as a differential 10 that includes a disconnect mechanism 12 and a locking mechanism 14. The disconnect mechanism 12 permits torque to be selectively provided through the differential 10. In this way, a vehicle including the differential 10 may be operated, for example, in a 2-wheel drive mode when the disconnect mechanism 12 is in a disconnected state, and a 4-wheel drive mode when the disconnect mechanism 12 is in a connected state and torque is transmitted through the differential 10. The locking mechanism 14 permits the differential 10 to be operated in an open mode permitting rotation of two output shafts 16, 18 at different speeds, and in a locked mode in which the output shafts 16, 18 rotate at the same speed. The differential 10 may be used in a variety of vehicles, including those powered by different motive power devices or sources, such as a combustion engine, electric motor, or both, to provide selective 4-wheel drive and to permit selective locking of the differential 10.

The differential 10 includes a first, or outer housing 20, two or more pinion gears 22, and a pair of side gears 24, 26 that are arranged to be coupled to the rotating shafts 16, 18 that may drive, for example, wheels of a vehicle. Thus, the side gears 24, 26 rotate with the shafts 16, 18 (shown diagrammatically in FIG. 1) about a shaft axis 28 and the pinion gears 22 are rotatable about an axis 30 defined by a pinion gear shaft 32 extending through the pinion gears 22. The pinion gear shaft 32 is connected to a second, or inner housing 34 that is rotatable relative to the outer housing 20. The outer housing 20 is coupled to and rotates with an outer, ring gear 36 (shown diagrammatically in FIG. 1) that is driven by the vehicle motive power source (e.g. engine, motor or both).

The differential 10 includes a first clutch 40 that defines at least part of the disconnect mechanism 12 and, when engaged, couples the inner housing 34 to the outer housing 20 so that the inner housing 34 rotates with the outer housing 20. The first clutch 40 may be of any desired construction and, in at least some implementations, is an engaging clutch such as a dog clutch. The clutch includes a first clutch member 42 that is not movable in an axial direction (defined by the central axis of the plunger 60 and clutch), and a second clutch member 44 that is movable in the axial direction relative to the first clutch member 42 to selectively mesh with, contact or engage the first clutch member 42. The first clutch member 42 and second clutch member 44 may be annular, and coaxial with the side gears 24, 26. The first clutch member 42 may include or be defined by drive features, such as teeth or other drive features, formed on the inner housing 34 or a component fixed to the inner housing 34. The second clutch member 44 is coupled to the outer housing 20 and rotates with the outer housing 20, is movable relative to the first clutch member 42, and includes mating drive features, such as teeth, that are meshed with the teeth of the first clutch member 42 in the engaged position or engaged state of the first clutch 40. The second clutch member 44 is driven from a retracted position (FIGS. 1 and 2) in which the second clutch member 44 is not in contact with the first clutch member 42, to an advanced position (FIGS. 3 and 4) in which the second clutch member 44 is in contact with the first clutch member 42. In the advanced position, the first clutch 40 is engaged and the disconnect mechanism 12 is in a connected state in which the inner housing 34 is coupled to the outer housing 20 so that the inner housing 34 rotates with the outer housing 20.

The differential 10 also includes a second clutch 46 that defines at least part of the locking mechanism 14 and, when engaged, couples the inner housing 34 to the side gears 24, 26, and thus shafts 16, 18, so that the shafts 16, 18 rotate with the inner housing 34. The second clutch 46 may be of any desired construction and, in at least some implementations, is an engaging clutch such as a dog clutch. The second clutch 46 includes a first clutch member 48 that is not movable in an axial direction (defined by the central axis of the plunger 60 and second clutch 46), and a second clutch member 50 that is movable in the axial direction relative to the first clutch member 48 to selectively mesh with, contact or engage the first clutch member 48 and define an engaged position or engaged state of the second clutch 46. The first clutch member 48 of the second clutch 46 may be defined by drive features, such as teeth or other drive features, formed on the adjacent side gear (shown as the first side gear) or a component fixed to the side gear. The second clutch member 50 is connected to the inner housing 34 so that the second clutch member 50 rotates with the inner housing 34 and so that the second clutch member 50 can slidably move relative to the inner housing 34.

In at least some implementations, the second clutch member 50 may be keyed or splined to the inner housing 34, with one or more keys/projections received in complementary slots arranged axially (e.g. parallel to the central axis), to permit axial movement of the second clutch member 50 relative to the inner housing 34 and the side gear. The second clutch member 50 could have multiple circumferentially spaced apart and axially extending legs 51 (one is shown and labeled in FIG. 1) received in openings 53 in the inner housing 34. When the second clutch 46 is in the engaged state, the differential 10 is in a locked mode and torque is transmitted to both shafts 16, 18 with relative rotational movement restricted between the shafts 16, 18 so that both shafts 16, 18 rotate at the same speed.

In at least some implementations, the first clutch 40 is driven by a first actuator 52 and the second clutch 46 is driven by a second actuator 54 that is separately actuatable and located separate from the first actuator 52. In the implementation shown in the drawings, both clutches 40, 46 are driven by electromagnetic actuators. For ease of description and understanding, the components of both actuators 52, 54 will be given the same reference numerals, as each may be of the same design (although this is not required).

The clutch actuators 52, 54 have a solenoid with an annular wire coil 58 and a drive member that may include an armature or plunger 60 that may be received at least partially radially inwardly of and axially overlapped with the coil 58. In at least some implementations, the plunger 60 is also annular, the plunger 60 and coil 58 are coaxially arranged about the axis 28 and are carried by the outer housing 20. One shaft 16 extends coaxially through a first bore 62 in a tubular first shaft mount 64 of the outer housing 20 over which the coil 58 and plunger 60 of the first actuator 52 are received. The other shaft 18 extends coaxially through a second bore 66 in a tubular second shaft mount 68 of the outer housing 20 over which the coil 58 and plunger 60 of the second actuator 54 are received. The shafts 16, 18 are coaxially aligned and extend outwardly from the outer housing 20 in opposite directions (e.g. 180 degrees opposed).

The plunger 60 may be formed from multiple materials including a material that is magnetically responsive to the magnetic field generated by the coil 58, and at least one other material that may or might not be responsive to the magnetic field. Thus, when the magnetic field is generated by the coil 58, the plunger 60 may be driven from one position to another (e.g. from the retracted to the advanced position). As used herein, a material is responsive to a magnetic field if a magnetic field of the magnitude generated by a solenoid of the type used in applications such as that described herein, may cause a component formed of or including such material to be displaced.

Figure 2:
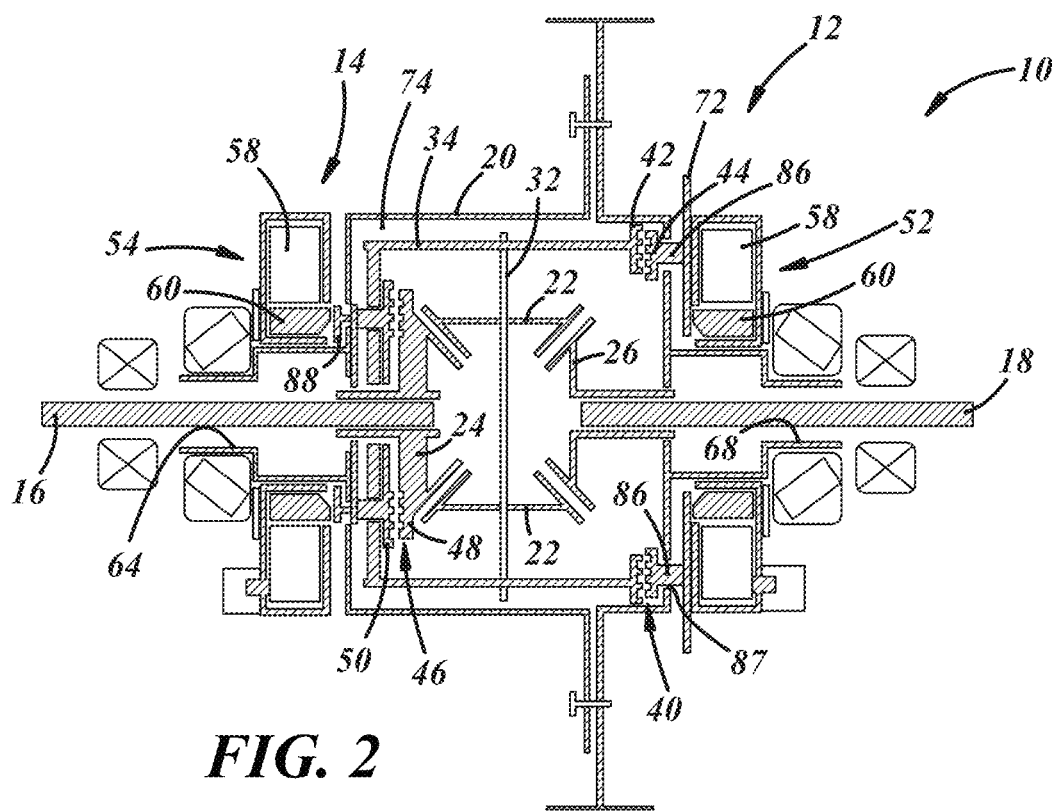
FIG. 2 is a diagrammatic view of the differential of FIG. 1 showing the disconnect mechanism in a disconnected state and the locking mechanism in an unlocked state.
Figure 3:
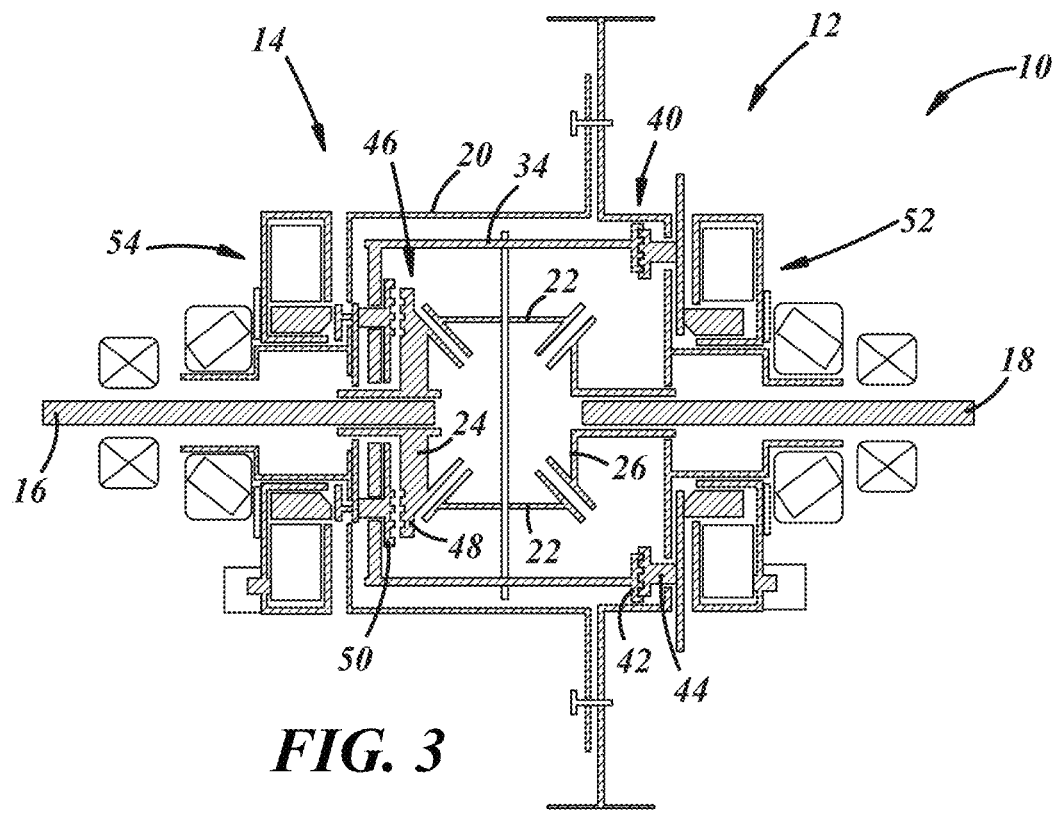
FIG. 3 is a diagrammatic view of the differential showing the disconnect mechanism in a connected state and the locking mechanism in the unlocked state.
Figure 4:
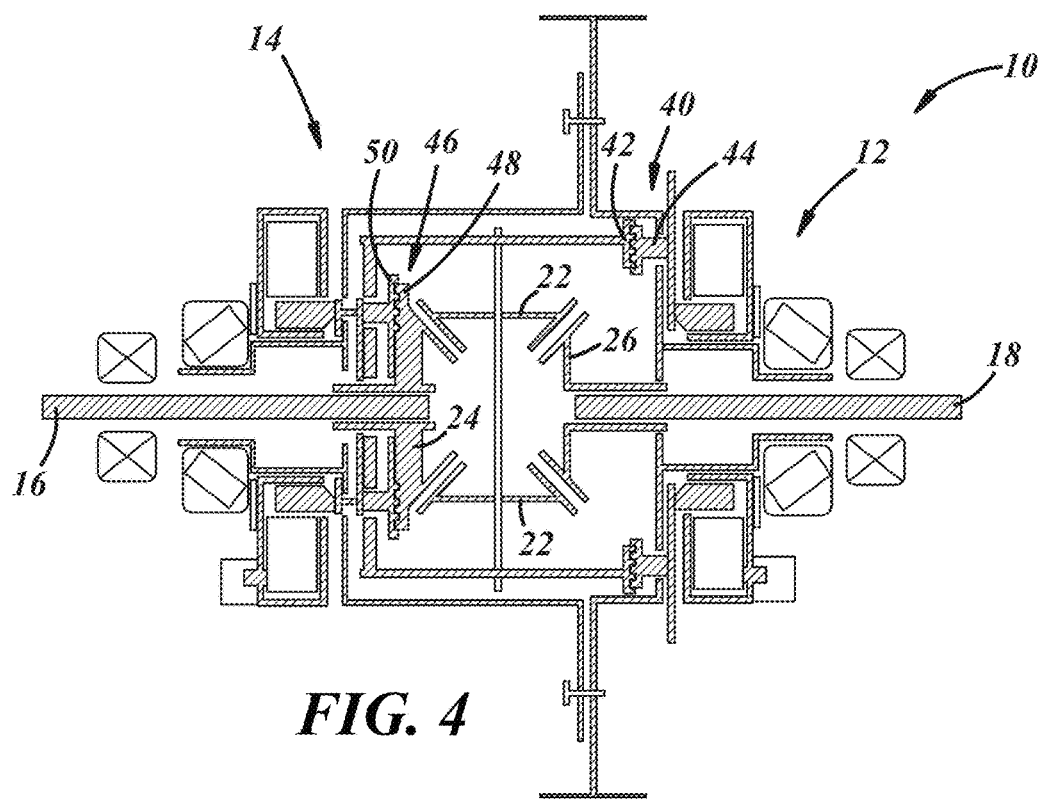
FIG. 4 is a diagrammatic view of the differential showing the disconnect mechanism in a connected state and the locking mechanism in a locked state.

When electric power is supplied to the coil 58 of an actuator 52, 54, a magnetic field is generated that displaces the plunger 60 relative to the coil 58 and outer housing 20 from a first or retracted position (FIGS. 1 and 2) to a second or advanced position (FIGS. 3 and 4). To facilitate return of the plunger 60 from the second position back to the first position when power is not provided to the coil 58, as shown in FIG. 1, a biasing member, such as a spring 70 may act on the plunger 60, or on a disc 72 or other component engaged with the plunger 60. In the example shown in FIG. 1, a disc 72 is connected to the second clutch member 44 and has a portion that is engageable by the plunger 60 so that the plunger 60 can drive the second clutch member 44 relative to the first clutch member 42. The disc may include an outer diameter or a part that extends radially outwardly a sufficient distance to enable position sensing of the disc, and hence the position of the second clutch member 44 to which it is attached, if desired.

In at least some implementations, the clutches 40, 46 are in their engaged states when their respective plunger 60 is in the second position, and the clutches 40, 46 are in their disengaged states when their respective plunger 60 is in the first position. While in the example shown the plungers 60 are in its second position when power is provided to the coils 58 and the plungers 60 move to the first positions when power is not supplied to the coils 58, the opposite could be true if desired (e.g. either or both clutches could be moved to the engaged position by the respective biasing member and disengaged by powering the respective coil 58).

In the example of FIGS. 1-4, the coils 58 are coupled to the shaft mounts 64, 68 and are located outboard of an interior 74 (labeled in FIG. 2) of the outer housing 20, where the gears 22, 24, 26, inner housing 34 and pinion gear shaft 32 are received within the interior 74. The coils 58 are received in coil housings 76 that are coupled to respective sleeves 78 that have inner surfaces received over an outer surface of the shaft mounts 64, 68, and with the plungers 60 received for sliding movement along an outer surface of the sleeves 78. The sleeves 78 may include a radially outwardly extending stop surface 80 that limits movement of the plungers 60 away from their respective first clutch members. An annular retaining member 82 (e.g. clip) may be fixed to the shaft mounts 64, 68 outboard of the sleeves 78, to retain the sleeves on the shaft mounts, which also retains the position of the coil 58.

Figure 5:
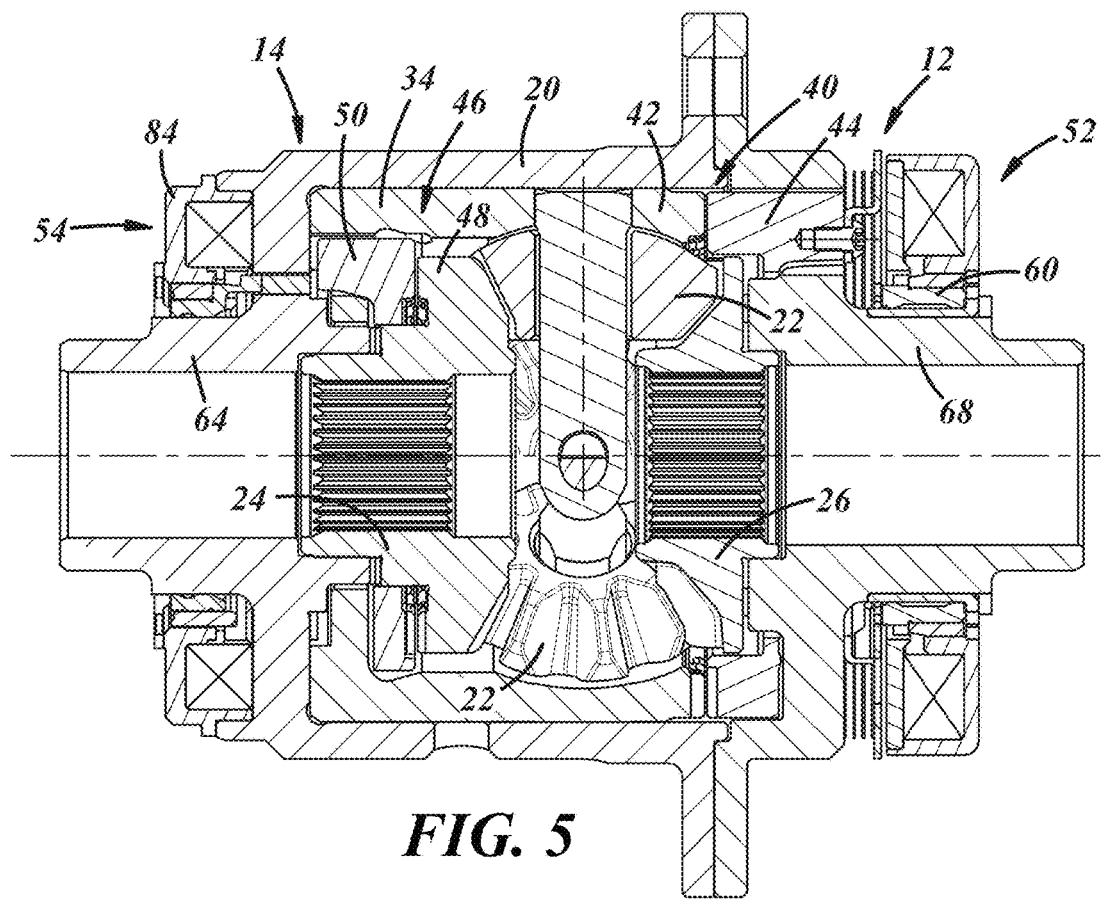
FIG. 5 is a diagrammatic view of a differential showing a modified actuator for the locking mechanism.

In the example shown in FIG. 5, the coil 58 of the second actuator 54 is received in a coil housing 84 that is coupled to the outer housing 20 and not to the shaft mount 64. This coil 58 is more "integrated" with the outer housing 20 and the plunger 60 may slide along the outer surface of the shaft mount 64 without a sleeve 78 between them. Other than the mounting of the coil 58 housing, the actuators 52, 54 of FIGS. 1 and 5 may operate in the same way, with differences only in the magnetic flux path of the generated magnetic fields. Further, while electromagnetic actuators 52, 54 are shown, the clutches could be actuated by other mechanism(s), such as a different linear actuator, or a motor that moves one part of the clutch, for example with one or more gears or cams.

In the example shown, the second clutch member 44 of the first clutch 40 has portions (e.g. feet 86, labeled in FIG. 2) that extend axially through openings 87 in the outer housing 20 so that part of the second clutch member 44 is received in the interior 74 of the outer housing 20 and part is outside of the interior 74. The second clutch member 50 of the second clutch 46 is shown as being fully received within the interior 74 of the outer housing 20 and to move the second clutch member 50, as shown in FIG. 1, a drive member 88 is driven by the plunger 60, where the drive member 88 may be annular and have axially extending portions (e.g. feet) that extend through openings in the outer housing 20. The drive member 88 may instead be defined by multiple separate components (e.g. pins) that extend through openings in the outer housing 20 and are circumferentially spaced apart to provide a more uniform actuating force on the second clutch member 50 of the second clutch 46.

A first disc 90 or washer may be received between the plunger 60 and the pins or other drive member(s) 88 to reduce wear on the components if relative rotation occurs. The disc 90 may also improve uniform movement of the pins 88 during an actuating stroke of the actuator, and the disc 90 may extend radially beyond the coil 58 housing to enable a position sensor to detect the position of the first disc, which relates to the position of the plunger 60 and hence, the clutch. A second disc 92 may be provided between the drive member(s) and the first clutch member 48 of the second clutch 46, to reduce wear on the components due to relative rotation.

In FIG. 2, the differential 10 is shown with both clutches 40, 46 in their disengaged positions. In the illustrated implementation, in the disengaged position of the clutches 40, 46, the coils 58 are not powered, the plungers 60 are in their first positions (i.e. retracted positions) and the second clutch members 44, 50 are not engaged with the first clutch members 42, 48. With the first clutch 40 not engaged, the disconnect mechanism 12 is in the disconnected position, and the shafts 16, 18 are not actively driven by the vehicle motive power source and the shafts may rotate relative to the second clutch member 44 of the first clutch 40 and the outer housing 20. With the second clutch 46 not engaged, the locking mechanism 14 is in the unlocked position, and the shafts 16, 18 may rotate at different speeds.

In FIG. 3, the first clutch 40 is in its engaged position and the second clutch 46 is in its disengaged position. To move the first clutch 40 to its engaged position, the coil 58 of the first clutch actuator 52 is powered to generate a magnetic field that drives the plunger 60 to its second position (i.e. advanced position) which drives the second clutch member 44 into engagement with the first clutch member 42. In this position, the disconnect mechanism 12 is in the connected state in which the inner housing 34 is coupled to and rotates with the outer housing 20, and torque is transmitted to the shafts 16, 18. Because the locking mechanism 14 is still in the unlocked position (the coil 58 of the second clutch 46 was not powered), the shafts 16, 18 may rotate at different speeds in an open differential mode.

In FIG. 4, the first clutch 40 is in its engaged position so the disconnect mechanism 12 is in the connected state as noted with regard to FIG. 3. The second clutch 46 is in its engaged position. To move the second clutch 46 to its engaged position, the coil 58 of the second clutch actuator 54 is powered to generate a magnetic field that drives the second plunger 60 to its second position (i.e. advanced position) which drives the second clutch member 50 of the second clutch 46 into engagement with the first clutch member 48 of the second clutch 46. In this position, the locking mechanism 14 is in the locked position and the shafts 16, 18 rotate at the same speed in a locked differential mode.

As noted above, both the second clutch member 44 of the first clutch 40 and the first clutch member 48 of the second clutch 46 are coupled to the inner housing 34. In this way, when the disconnect mechanism 12 is in the connected position, torque is transmitted through the inner housing 34 and the differential gears to the shafts 16, 18 so that the shafts 16, 18 are actively driven by the vehicle motive power source. Further, when the locking mechanism 14 is in the locked position, the torque flow is more balanced within the device and the disconnect cam ring does not experience loads as high as it would if the locking mechanism 14 were not connected to the inner housing 34 (e.g. if the first clutch member 48 of the second clutch 46 were not coupled to the inner housing 34). When the disconnect mechanism 12 is in the connected state and the locking mechanism 14 is in the locked state, torque applied to the outer housing 20 flows to: a) the first shaft through the first clutch member 42 of the first clutch 40, the inner housing 34 (via the second clutch member 44 of the first clutch 40), the first clutch member 48 of the second clutch 46 (that is coupled to the inner housing 34) and then to the second clutch member 50 of the second clutch 46 and to the corresponding side gear; and b) the second shaft through the first clutch member 42 of the first clutch 40, the inner housing 34 (via the second clutch member 44 of the first clutch 40), the pinion gear 22(*s*) and the other side gear. A locking torque, for example when the vehicle is turning and the side shafts 16, 18 provide reactive torque on their side gears 24, 26 in opposite directions, is provided on the second clutch 46, the inner housing 34 and the differential gears, but the first clutch member 42 of the first clutch 40 does not directly bear this locking torque. In this way, the first clutch member of the first clutch 40 is not subjected to loads as high as in other arrangements.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

All terms used in the claims are intended to be given their broadest reasonable construction and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. A drivetrain component, comprising:
   a first housing arranged to be rotated by a vehicle motive power source;
   a second housing;
   differential gears coupled to the second housing, the differential gears including at least one pinion gear, a first side gear engaged with the pinion gear, and a second side gear engaged with the pinion gear;
   a first clutch, the first clutch has a first clutch member that is coupled to the second housing and a second clutch member that is coupled to the first housing, the first clutch has a disengaged state in which the first housing rotates relative to the second housing, and the first clutch has an engaged state in which the second housing is coupled to and rotates with the first housing;
   a second clutch, the second clutch has a first clutch member that is coupled to the first side gear and a second clutch member that is coupled to the second housing so that the second clutch member of the second clutch rotates at all times with the second housing, the second clutch has a disengaged state in which the first clutch member of the second clutch is not engaged with the second clutch member of the second clutch and the first side gear can rotate at a different speed than the second side gear, and the second clutch has an engaged state in which the first clutch member of the second clutch is engaged with the second clutch member of the second clutch and the first side gear and the second side gear rotate at the same speed.

2. The device of claim 1 wherein the first clutch member of the first clutch is defined by drive features formed on part of the second housing.

3. The device of claim 1 wherein the first clutch member of the second clutch is defined by drive features formed on part of the first side gear.

4. The device of claim 1 which also includes a first actuator carried by the first housing and operable to move the second clutch member of the first clutch relative to the first clutch member of the first clutch, and a second actuator carried by the first housing and operable to move the second clutch member of the second clutch relative to the first clutch member of the second clutch.

5. The device of claim 4 wherein the first actuator is an electromagnetic actuator having a coil that, when powered, produces a magnetic field to drive a drive member that in turn drives the second clutch member of the first clutch relative to the first clutch member of the first clutch.

6. The device of claim 5 wherein the second actuator is an electromagnetic actuator having a second coil that, when powered, produces a magnetic field to drive a second drive member that in turn drives the second clutch member of the second clutch relative to the first clutch member of the second clutch.

7. The device of claim 4 wherein the differential gears are received within an interior of the first housing, the first housing includes a first shaft mount having a first bore aligned with a first side gear opening of the first side gear so that a first shaft is receivable in the first shaft mount and the first side gear, the second actuator is mounted to the first shaft mount, the first housing includes a second shaft mount having a second bore aligned with a second side gear opening of the second side gear so that a second shaft is receivable in the second shaft mount and the second side gear, and the first actuator is mounted to the second shaft mount.

8. The device of claim 6 wherein the differential gears are received within an interior of the first housing, the first housing includes a first shaft mount having a first bore aligned with a first side gear opening of the first side gear so that a first shaft is receivable in the first shaft mount and the first side gear, the second actuator is mounted to the first shaft mount, the first housing includes a second shaft mount having a second bore aligned with a second side gear opening of the second side gear so that a second shaft is receivable in the second shaft mount and the second side gear, and the first actuator is mounted to the second shaft mount.

9. The device of claim 7 wherein the first shaft mount opening and the second shaft mount opening are coaxially aligned.

10. A drivetrain component, comprising:
a first housing arranged to be rotated by a vehicle motive power source;
a second housing;
differential gears coupled to the second housing, the differential gears including at least one pinion gear, a first side gear engaged with the pinion gear, and a second side gear engaged with the pinion gear;
a first clutch, the first clutch has a first clutch member that is coupled to the second housing and a second clutch member that is coupled to the first housing, the first clutch has a disengaged state in which the first housing rotates relative to the second housing, and the first clutch has an engaged state in which the second housing is coupled to and rotates with the first housing;
a second clutch, the second clutch has a first clutch member that is coupled to the first side gear and a second clutch member that is coupled to the second housing, the second clutch has a disengaged state in which the first clutch member of the second clutch is not engaged with the second clutch member of the second clutch and the first side gear can rotate at a different speed than the second side gear, and the second clutch has an engaged state in which the first clutch member of the second clutch is engaged with the second clutch member of the second clutch and the first side gear and the second side gear rotate at the same speed, wherein the second clutch member of the second clutch rotates with the second housing and is slidably movable relative to the second housing.

11. A drivetrain component, comprising:
an outer housing arranged to be driven by a vehicle motive power source;
an inner housing received at least partially in the outer housing and capable of rotation relative to the outer housing;
a first clutch with a first clutch member connected to the inner housing and a second clutch member connected to or defined by part of the router housing;
differential gears coupled to the inner housing, the differential gears including at least one pinion gear, a first side gear engaged with the pinion gear, and a second side gear engaged with the pinion gear;
a second clutch with a first clutch member of the second clutch being coupled to or defined by part of the first side gear, and with a second clutch member of the second clutch being coupled to the inner housing, wherein the first clutch has a disengaged position in which the first clutch member of the first clutch and the second clutch member of the first clutch are not engaged with each other and the inner housing is not coupled to the outer housing by the first clutch, the first clutch as an engaged position in which the first clutch member of the first clutch and the second clutch member of the first clutch are engaged with each other and the inner housing is coupled to the outer housing and torque from the vehicle motive power source is transferred to the inner housing via the outer housing, and wherein the second clutch has a disengaged position in which the first clutch member of the second clutch and the second clutch member of the second clutch are not engaged with each other and the first side gear is not coupled to the inner housing by the second clutch, and the second clutch as an engaged position in which the first clutch member of the second clutch and the second clutch member of the second clutch are engaged with each other and the first side gear and the second side gear rotate at the same speed, and wherein the second clutch member of the second clutch is connected to the inner housing when the first clutch is in either the engaged state or the disengaged state.

12. The device of claim 11 wherein the first clutch member of the first clutch is defined by drive features formed on part of the inner housing.

13. The device of claim 11 wherein the first clutch member of the second clutch is defined by drive features formed on part of the first side gear.

14. The device of claim 11 wherein the second clutch member of the second clutch rotates with the inner housing and is slidably movable relative to the inner housing.

15. The device of claim 11 which also includes a first actuator carried by the outer housing and operable to move the second clutch member of the first clutch relative to the first clutch member of the first clutch, and a second actuator carried by the outer housing and operable to move the second clutch member of the second clutch relative to the first clutch member of the second clutch.

16. The device of claim 15 wherein the first actuator is an electromagnetic actuator having a coil that, when powered, produces a magnetic field to drive a drive member that in turn drives the second clutch member of the first clutch relative to the first clutch member of the first clutch.

17. The device of claim 16 wherein the second actuator is an electromagnetic actuator having a second coil that, when powered, produces a magnetic field to drive a second drive member that in turn drives the second clutch member of the second clutch relative to the first clutch member of the second clutch.

18. The device of claim 15 wherein the differential gears are received within an interior of the outer housing, the outer housing includes a first shaft mount having a first bore aligned with a first side gear opening of the first side gear so that a first shaft is receivable in the first shaft mount and the first side gear, the second actuator is mounted to the first shaft mount, the outer housing includes a second shaft mount having a second bore aligned with a second side gear opening of the second side gear so that a second shaft is receivable in the second shaft mount and the second side gear, and the first actuator is mounted to the second shaft mount.

* * * * *